United States Patent
Abello et al.

(10) Patent No.: US 11,654,983 B2
(45) Date of Patent: May 23, 2023

(54) ROTATABLE ELEMENT IN MACHINE TRACK HAVING THRUST WASHER STACK FOR STEPPING DOWN RELATIVE SPEEDS

(71) Applicant: Caterpillar Inc., Deerfield, IL (US)

(72) Inventors: Benoit Abello, Dunlap, IL (US); Paul Palthey-Glomeau, Peoria, IL (US); Brian Loeffler, Germantown Hills, IL (US); David Jennings Hakes, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 1013 days.

(21) Appl. No.: 16/436,209

(22) Filed: Jun. 10, 2019

(65) Prior Publication Data
US 2020/0386271 A1    Dec. 10, 2020

(51) Int. Cl.
| | |
|---|---|
| B62D 55/15 | (2006.01) |
| F16C 17/04 | (2006.01) |
| F16C 33/12 | (2006.01) |
| F16C 33/76 | (2006.01) |
| B62D 55/14 | (2006.01) |

(52) U.S. Cl.
CPC ............ B62D 55/15 (2013.01); B62D 55/14 (2013.01); F16C 17/045 (2013.01); F16C 33/122 (2013.01); F16C 33/761 (2013.01)

(58) Field of Classification Search
CPC ...... B62D 55/14; B62D 55/145; B62D 55/55; F16C 17/045; F16C 17/10; F16C 17/102; F16C 17/105; F16C 17/107; F16C 33/122; F16C 33/124; F16C 33/125; F16C 33/127; F16C 33/761

USPC .......................................................... 305/199
See application file for complete search history.

(56) References Cited

U.S. PATENT DOCUMENTS

| | | | |
|---|---|---|---|
| 2,931,451 A | 4/1960 | Hancock | |
| 3,420,584 A | 1/1969 | Cannon | |
| 3,463,560 A * | 8/1969 | Dadds ................ | B62D 55/096 305/59 |
| 3,910,128 A * | 10/1975 | Boggs ................. | B62D 55/15 474/151 |
| 4,209,205 A * | 6/1980 | Gregg .................. | B62D 55/15 305/119 |

(Continued)

FOREIGN PATENT DOCUMENTS

| | | |
|---|---|---|
| DE | 1859512 | 10/1962 |
| DE | 2927206 | 1/1981 |

(Continued)

*Primary Examiner* — Nathan Cumar (57) ABSTRACT

A sealed and lubricated rotatable track engaging element includes a roller and a roller shaft extending through the roller to support the roller for rotation about a major axis. A first thrust surface is fixed relative to the roller, and a second thrust surface is fixed relative to the roller shaft. A seal cavity extends between the roller and the roller shaft and is formed in part by each of the first thrust surface and the second thrust surface, and a thrust washer stack is within the seal cavity and trapped between the first thrust surface and the second thrust surface. The thrust washer stack includes an inner thrust washer contacting the roller to rotate at a first fractional speed of a speed of rotation of the roller, and an outer thrust washer contacting the inner thrust washer and the collar to rotate at a second fractional speed that is less than the first fractional speed.

20 Claims, 5 Drawing Sheets

(56) References Cited

U.S. PATENT DOCUMENTS

| | | | |
|---|---|---|---|
| 4,776,237 A | 10/1988 | Premiski et al. | |
| 8,894,537 B2 | 11/2014 | Norem et al. | |
| 10,046,816 B2 | 8/2018 | Johannsen | |
| 2010/0209180 A1* | 8/2010 | Hasselbusch | F16J 15/344 |
| | | | 403/150 |
| 2011/0121643 A1* | 5/2011 | Mulligan | B62D 55/15 |
| | | | 305/136 |
| 2015/0274228 A1* | 10/2015 | Kita | B62D 55/15 |
| | | | 305/136 |
| 2016/0176455 A1* | 6/2016 | Nuechterlein | B62D 55/305 |
| | | | 29/434 |
| 2017/0050687 A1* | 2/2017 | Kaufmann | B62D 55/088 |
| 2017/0369111 A1 | 12/2017 | Recker | |

FOREIGN PATENT DOCUMENTS

| | | |
|---|---|---|
| FR | 2209348 | 6/1974 |
| JP | 2610269697 | 12/2010 |

* cited by examiner

ROTATABLE ELEMENT IN MACHINE TRACK HAVING THRUST WASHER STACK FOR STEPPING DOWN RELATIVE SPEEDS

TECHNICAL FIELD

The present disclosure relates generally to an undercarriage assembly for machine track, and more particularly to a rotatable track engaging element having thrust washer stacks trapped between thrust surfaces.

BACKGROUND

Ground-engaging tracks are used in many different machines operated in off-highway environments across the globe. Machine tracks typically include an endless loop of coupled-together track links that extends about rotatable track engaging elements such as one or more idlers, track rollers, carrier rollers, and a drive sprocket. Significant engineering efforts over the years have been directed at design of track systems to provide robust support for heavy machines and traction in harsh environments. Track-type machines can weigh several million pounds, and off-highway worksites can have substrates formed of hard and/or uneven materials that subject the equipment to demanding wear conditions, slippery underfoot conditions, high mechanical loads, and corrosive environments. Loads experienced by components in track systems for such machines can have various forms, including bending loads, twisting loads, and thrust loads that are reacted along and between adjacent components, commonly rotating relative to one another.

In the case of large mining and material production machines, such as track-type tractors configured for production dozing, track service can require significant machine downtime during which the machine is not operational, and heavy equipment as well as specially trained personnel may be required to properly inspect, repair, replace, or otherwise diagnose and address issues with a machine's track. Such downtime can have significant economic consequences, especially in the event of an unplanned field failure. Thrust rings and the like can be subjected to high axial loads and relative rotation during operating a track system and can sometimes fail prematurely or degrade in performance. U.S. Pat. No. 10,046,816 to Johannsen is directed to a cartridge assembly with a flexible thrust ring assembly for a track chain. Johannsen proposes a flexible thrust washer having a body with an annular skirt portion that defines a central aperture, with the body having a conical configuration and the outer diameter of the skirt portion being spaced away from the central aperture. The body defines at least two slits that separate the annular skirt portion into a plurality of fingers. While Johannsen may work well for a variety of applications, there is always room for improvement and/or alternative strategies.

SUMMARY OF THE INVENTION

In one aspect, an undercarriage assembly includes a roller having a bore formed therein defining a major axis, and a roller shaft extending through the bore to support the roller for rotation about the major axis. The undercarriage assembly further includes a seal cavity extending between the roller and the roller shaft and formed in part by a first thrust surface that faces a first axial direction and is fixed relative to the roller, and a second thrust surface that faces a second axial direction opposite to the first axial direction and is fixed relative to the roller shaft. A thrust washer stack is trapped between the first thrust surface and the second thrust surface, to react thrust loads between the roller and the roller shaft, and a dynamic seal fluidly seals the thrust washer stack within the seal cavity.

In another aspect, a rotatable track engaging element for a machine track includes a roller shaft having a first shaft end and a second shaft end, and a roller defining a major axis and being positioned upon the roller shaft. The rotatable track engaging element further includes a first shaft support structured to mount to a frame and receiving the first shaft end, and a second shaft support structured to mount to the frame and receiving the second shaft end. The rotatable track engaging element further includes a first thrust washer stack positioned upon the roller shaft and including a plurality of thrust washers trapped between the first shaft support and the roller, and a second thrust washer stack positioned upon the roller shaft and including a plurality of thrust washers trapped between the second shaft support and the roller.

In still another aspect, a sealed and lubricated rotatable track engaging element includes a roller having a bore formed therein defining a major axis, and a roller shaft extending through the bore to support the roller for rotation about the major axis. A first thrust surface is fixed relative to the roller and faces a first axial direction, and a second thrust surface is fixed relative to the roller shaft and faces a second axial direction. A seal cavity extends between the roller and the roller shaft and is formed in part by each of the first thrust surface and the second thrust surface, and a thrust washer stack is within the seal cavity and trapped between the first thrust surface and the second thrust surface.

DETAILED DESCRIPTION

Figure 1:
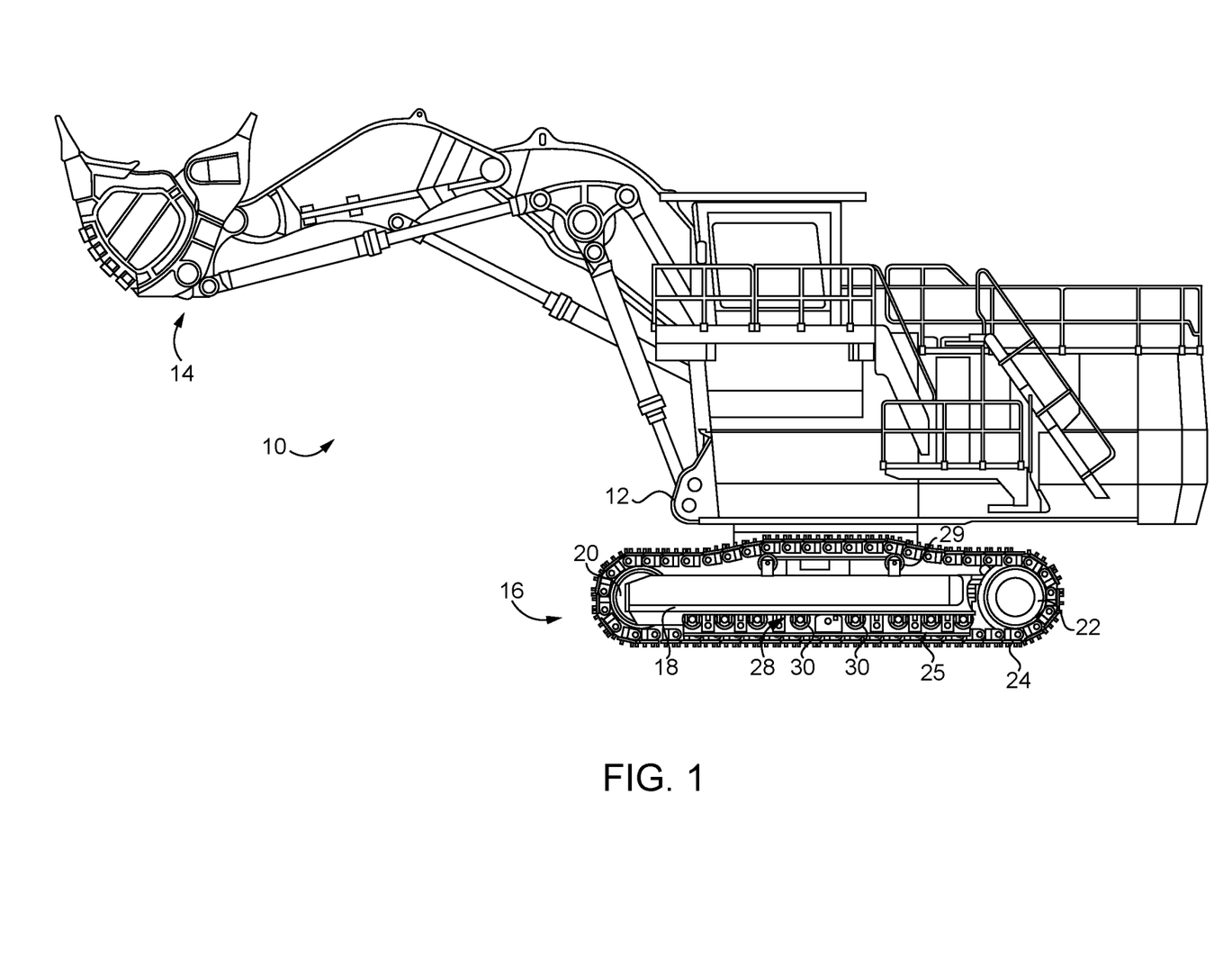
FIG. 1 is a side diagrammatic view of a machine, according to one embodiment.

Referring to FIG. 1, there is shown a machine 10, according to one embodiment. Machine 10 includes a track-type machine having a machine frame 12, and an implement system 14 coupled to frame 12. Frame 12 may be supported on and rotatable relative to a ground-engaging track system 16. Track system 16 includes a track roller frame 18, an idler 20, a drive sprocket 22, and a plurality of track rollers 26 mounted to track roller frame 18. A plurality of carrier rollers 29 are also mounted to track roller frame 18 in a generally conventional manner. A ground-engaging track 24 extends about idler 20, drive sprocket 22, track rollers 26, and carrier rollers 29. Machine 10 is shown in the context of a mining machine, namely, a hydraulic mining shovel or the like where implement system 14 includes a hydraulically actuated implement system structured to operate at least primarily at a working face of a mine. Machine 10 could alternatively be a rope shovel, such as an electric rope shovel, or a variety of other types of equipment such as a track-type tractor or an excavator. Those skilled in the art will appreciate that certain mining machines, such as the illustrated hydraulic mining shovel, may be operated approximately 90% of the time or more at fixed locations at a worksite, such as at a working face to capture, lift, and dump material into mining trucks or another conveyance mechanism, and thus are trammed only a minority of the time. Such mining machines typically weigh in excess of 1,000 tons, and despite the relative infrequency of tramming can subject their tracks to extreme wear, loading, and material deformation, for instance. It is generally desirable for tracks in such machines to have a service life in the tens of thousands of hours. As discussed herein, machine 10, and track system 16 in particular, is structured for an extended service life and operational reliability, especially with respect to managing thrust loads between the various rotatable track engaging elements and track roller frame 18. Rotatable track engaging elements can be understood herein to include idler 20, drive sprocket 22, track rollers 26, and carrier rollers 29. Enhanced thrust load management can reduce risk of premature failure or necessity for unexpected field service and machine downtime.

Figure 2:
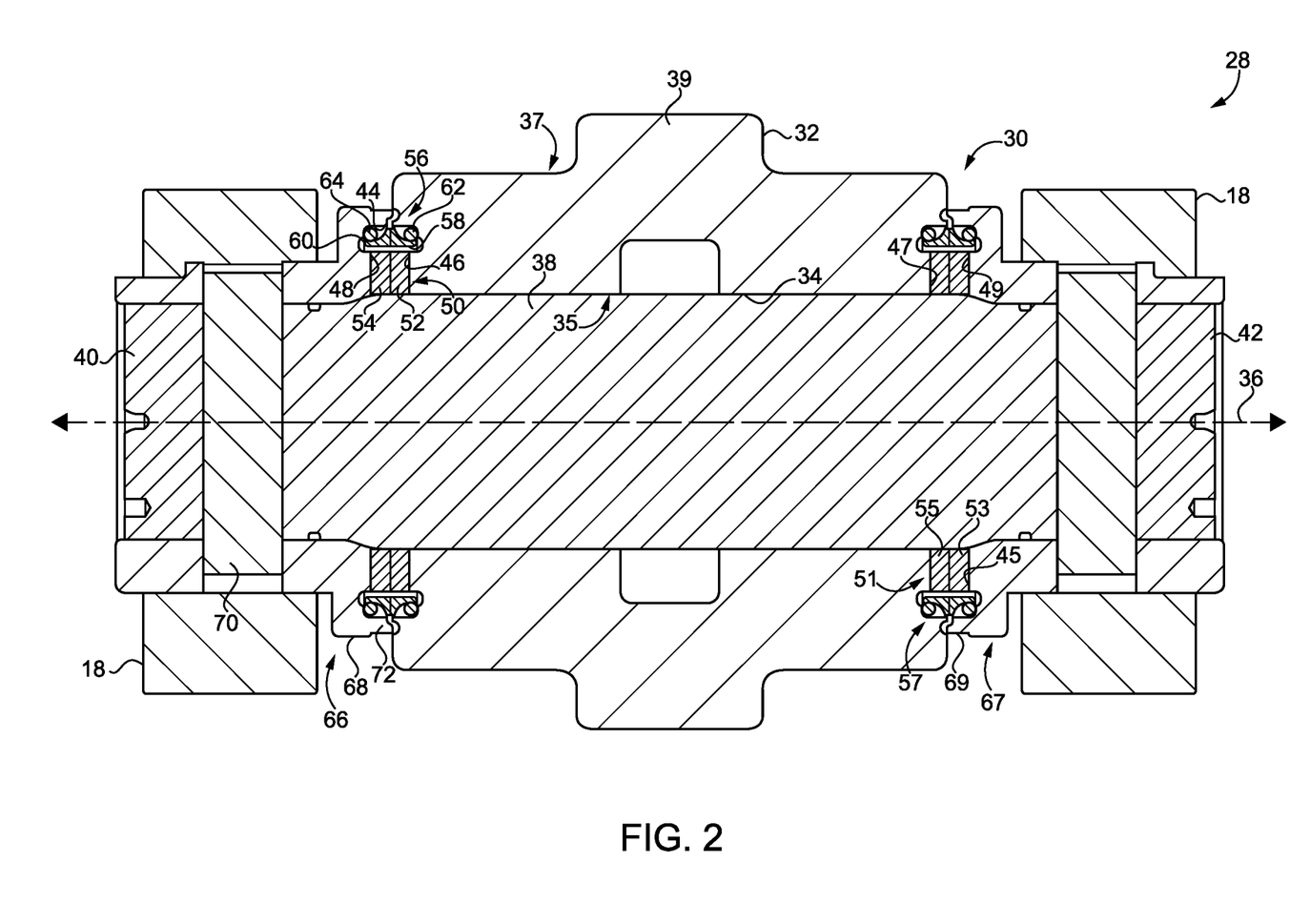
FIG. 2 is a sectioned side diagrammatic view of an undercarriage assembly, according to one embodiment.

Referring also now to FIG. 2, there is shown an undercarriage assembly 28 including a rotatable track engaging element in the context of one of track rollers 30 and track roller frame 18. Discussion herein of track roller 30, hereinafter referred to in the singular, should be understood to refer by way of analogy to any of the track rollers 30 that might be used in ground-engaging track system 60. Moreover, discussion herein of any one embodiment of a rotatable track engaging element should be understood to refer by way of analogy to any other embodiment contemplated herein except where otherwise indicated or apparent from the context. Track roller 30 includes a roller 32 having a bore 34 formed therein defining a major axis 36. Roller 32 may be a roller shell having an inner surface 35 and an outer surface 37. Outer surface 37 can be contoured to include a raised protrusion or pad 39 that extends circumferentially around major axis 36 and is generally linear in profile. Outer surface 37 at locations adjacent to pad 39 can contact track rails formed by track shoes 25 in track 24, with pad 39 fitted between the rails within a track guiding space. Alternatively, pad 39 can contact a single center track rail, or still another pattern of contact between track roller 30 and track 24 might be used. Track roller 30 further includes a roller shaft 38 extending through bore 34 to support roller 32 for rotation about major axis 36. Roller shaft 38 includes a first shaft end 40 and an opposite second shaft end 42. Undercarriage assembly 28, and track roller 30, can further include a first shaft support 66 structured to mount to track roller frame 18 and receiving first shaft end 40, and a second shaft support 67 also structured to mount to track roller frame 18 and receiving second shaft end 42. In the illustrated embodiment first shaft support 66 and second shaft support 67 include, respectively, a first collar 68 and a second collar 69. A pin 70 extends through roller shaft 38 and first collar 68 and fixes roller shaft 38 to first collar 68. Another pin (not numbered) analogously fixes roller shaft 38 to second collar 69. Each of first shaft support 66 and second shaft support 67 can be received in and mounted to track roller frame 18 according to any suitable strategy. First collar 68 and second collar 69 could include multi-piece clamping collars, which can be clamped about first shaft end 40 and second shaft end 42, and bolted to track roller frame 18, or alternatively could each be a single-piece component.

Track roller 30 includes a sealed and lubricated rotatable track engaging element, and to this end includes a first seal cavity 44 extending between roller 32 and roller shaft 38, and formed in part by a first thrust surface 46 that faces a first axial direction and is fixed relative to roller 32, and a second thrust surface 48 that faces a second axial direction opposite to the first axial direction and is fixed relative to roller shaft 38. An axial direction herein means a direction along major axis 36. Hence, in the illustrated embodiment the first axial direction is an axially inward direction, and the second axial direction is an axially outward direction. In other embodiments, and for other parts of track roller 30, a first axial direction may be an axially outward direction and a second axial direction may be an axially inward direction. No limitation is intended by use of the terms "first" or "second" as those terms are used herein merely for convenience of description. Another seal cavity 45 extends between roller 32 and roller shaft 38 and is formed in part by a first thrust surface 47 that faces a first axial direction and is fixed relative to roller 32, and a second thrust surface 49 that faces a second axial direction opposite to the first axial direction and is fixed relative to roller shaft 38.

Track roller 30 further includes a first thrust washer stack 50 trapped between first thrust surface 46 and second thrust surface 47, to react thrust loads between roller 32 and roller shaft 38, and a second thrust washer stack 51 trapped between first thrust surface 47 and second thrust surface 49, also to react thrust loads between roller 32 and roller shaft 38. A first dynamic seal 56 is held in compression between roller 32 and roller shaft 38 and seals first thrust washer stack 50 within seal cavity 44. A second dynamic seal 57 is held in compression between roller 32 and roller shaft 38 and seals second thrust washer stack 51 within seal cavity 45. In a practical implementation strategy, first dynamic seal 56 includes a face seal assembly having a sealing ring 58 and a seal biaser 62, and second dynamic seal 57 includes a face seal assembly including a sealing ring 60 and a seal biaser 64. Dynamic seal assemblies 56 and 57 can include metallic face seal assemblies where sealing rings 58 and 60 each include metallic sealing rings. Each seal biaser 62 and 64 can include a non-metallic seal biaser in the nature of a toric that is compressed in opposition to an internal bias to urge sealing rings 58 and 60 into contact with one another. Lubricating fluid may be positioned in each of seal cavity 44 and seal cavity 45. For reasons that will be apparent from the following description, implementing thrust washer stacks 50 and 51 in track roller 30 and analogous configurations in other embodiments, can be expected to reduce a risk of seal failure caused by excessive thrust washer wear and avoid or delay development of other problems.

First thrust washer stack 50 may include a first thrust washer 52 in contact with first thrust surface 46, and a second thrust washer 54 in contact with first thrust washer 52 and with second thrust surface 48. At least one of first thrust washer 52 or second thrust washer 54 is free to rotate about major axis 36. Second thrust washer stack 51 may include a first thrust washer 53 in contact with first thrust surface 47, and a second thrust washer 55 in contact with second thrust surface 49. At least one of first thrust washer 53 or second thrust washer 55 is free to rotate about major axis 36. In a practical implementation strategy applicable to all embodiments contemplated herein, each of the thrust washers in the respective thrust washer stacks 50 and 51 is free to rotate about major axis 36, the significance of which will be further apparent from the following description. First thrust washer stack 50 and second thrust washer stack 51 may each include a total of two thrust washers 52 and 54, and 53 and 55, respectively, and the plurality of thrust washers of each of first thrust washer stack 50 and second thrust washer stack 51 may be substantially identical to one another. Dynamic seal 56 and dynamic seal 57 fluidly seal thrust washer stacks 50 and 51 within seal cavities 44 and 45, respectively. In other embodiments, a number of thrust washers greater than two might be used in any individual thrust washer stack, such as three. It will be recalled that first shaft support 66 and second shaft support 67 may include a first collar 68 and a second collar 69, respectively. First thrust washer stack 51 is in contact with at least one of roller 32 or roller shaft 38, and second thrust washer stack 51 is in contact with at least one of roller 32 or roller shaft 38. In the embodiment of FIG. 2, first thrust washer stack 50 is positioned to contact each of roller 32 and first collar 68 to directly react thrust loads between roller 32 and first collar 68. Second thrust washer stack 51 is positioned to contact each of roller 32 and second collar 69 to directly react thrust loads between roller 32 and second collar 69. One of first thrust surface 46 or second thrust surface 48 is formed on first collar 68, and by analogy one of first thrust surface 47 or second thrust surface 49 is formed on second collar 69. It will be appreciated that the locations of thrust surfaces amongst embodiments can vary, in other words whether an axially inward-facing or an axially outward-facing thrust surface is fixed relative to a roller versus fixed relative to a roller shaft can be varied, as well as whether thrust surfaces are formed directly upon target components such as a roller or a collar or instead upon intervening components. Some of the possible variations are explicitly disclosed herein in connection with discussion of alternative embodiments.

Figure 3:
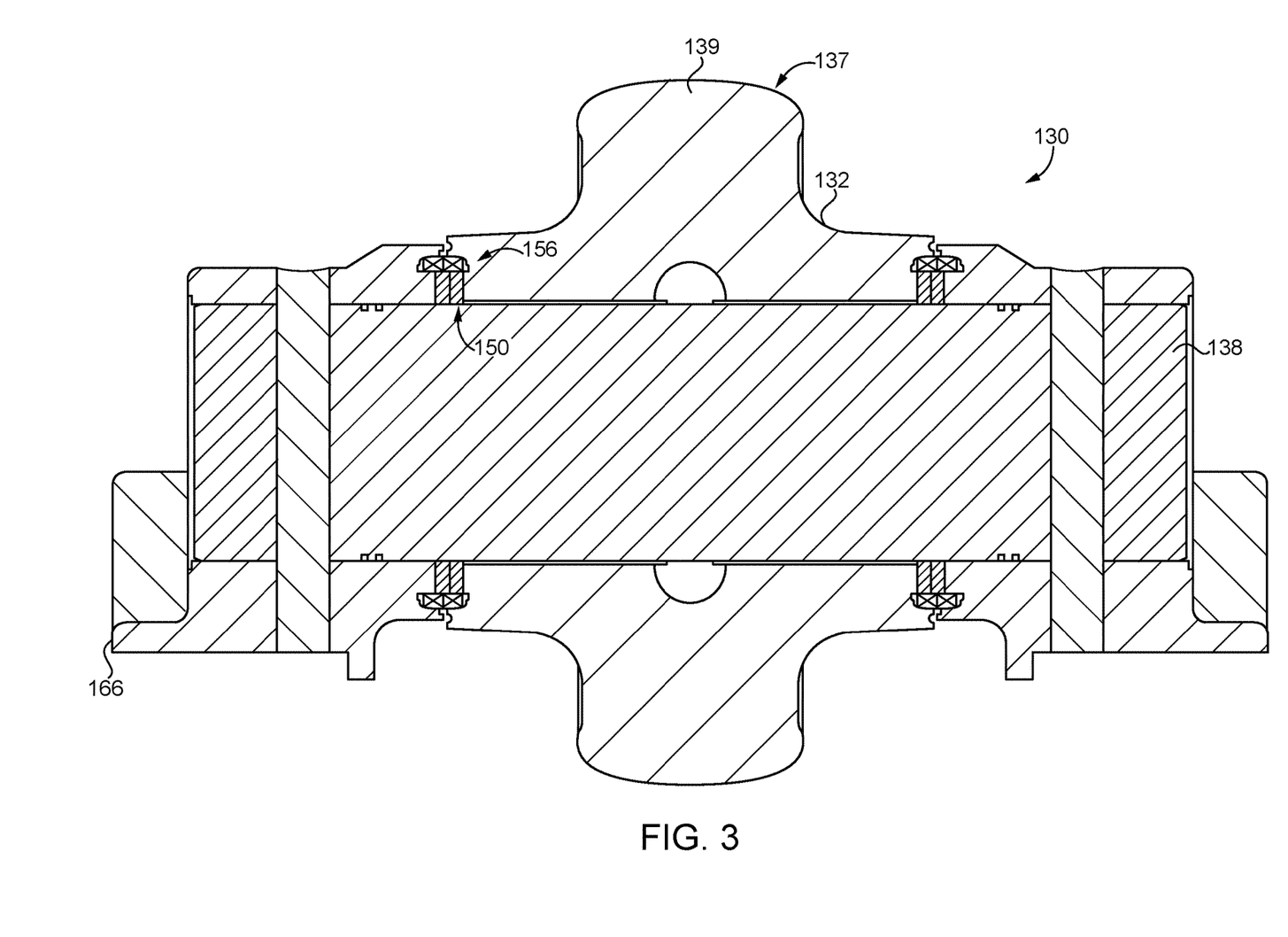
FIG. 3 is a sectioned side diagrammatic view of a rotatable track engaging element, according to one embodiment.

Referring now to FIG. 3, there is shown a track roller 130 according to another design and having various similarities with the embodiment of FIG. 2, but certain differences. Track roller 130 includes a roller 132 that can be a roller shell, having an outer surface 137 and a protrusion or pad 139. A thrust washer stack 150 is trapped between thrust surfaces (not numbered) on roller 132 and a shaft support 166, and fluidly sealed within track roller 130 by way of a dynamic seal 156, which can be a metal face seal assembly generally analogous to that described in connection with track roller 30 above. Shaft support 166 could be structured differently from shaft support 66 in undercarriage assembly 28, and an outer profile of roller 132 formed by outer surface 137 can likewise be different. It can be noted that pad 139 has a rounded outer contour, in profile extending generally left to right in the illustration of FIG. 3. The rounded outer contour can be adapted for supporting and distributing heavy machine loads between pad 139 and an associated track rail and potentially providing sacrificial wear material.

Figure 4:
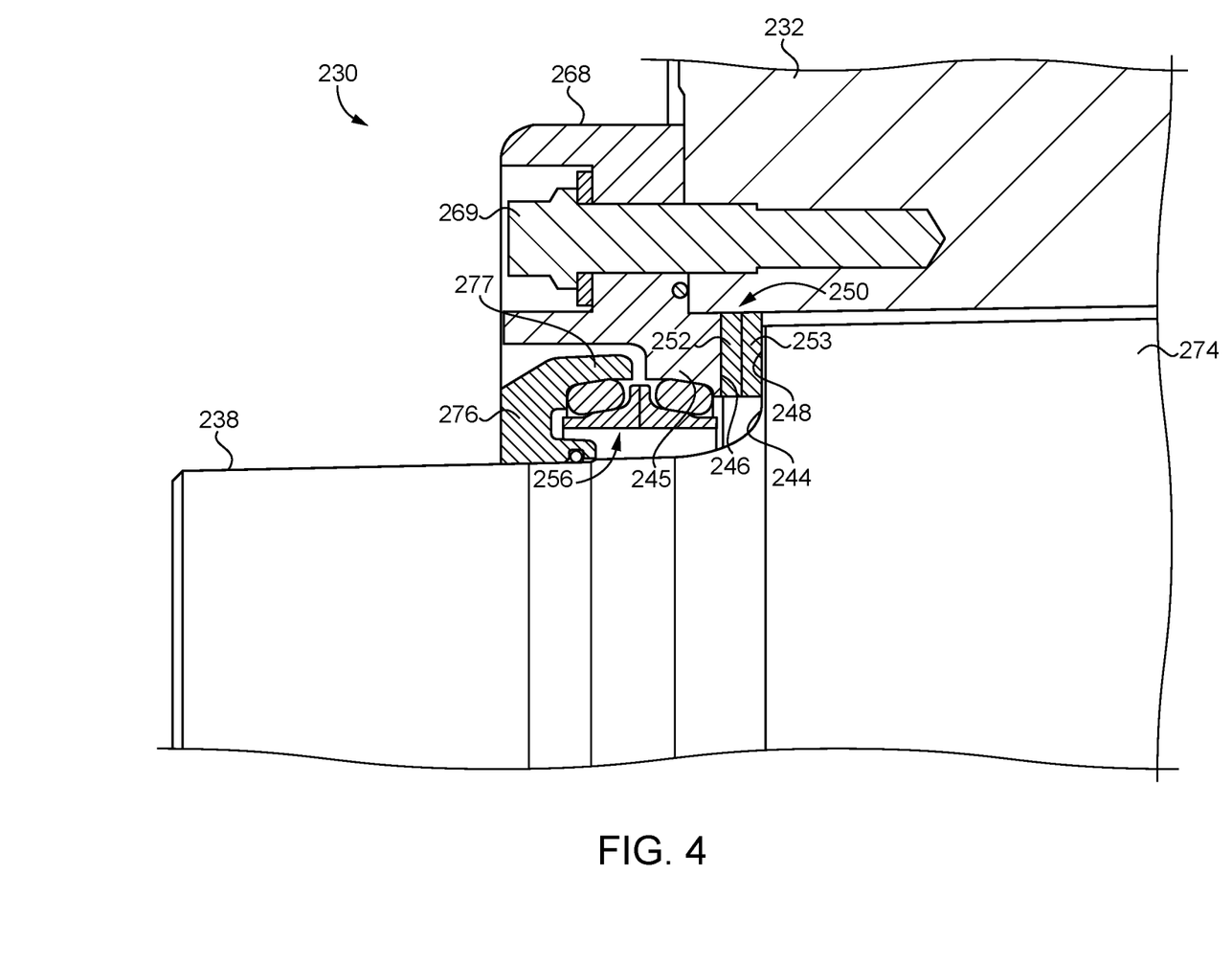
FIG. 4 is a partially sectioned side diagrammatic view of a portion of a rotatable track engaging element, according to another embodiment.

Referring now to FIG. 4, there is shown a rotatable track engaging element or track roller 230 according to yet another embodiment, and including a roller 232 and a roller shaft 238. Roller shaft 238 includes an enlarged center section 274 that is positioned radially inward of roller 232. Track roller 230 also includes a clamped collar 268 that is bolted to roller 232 by way of a plurality of bolts, one of which is shown at numeral 269. A seal cavity 244 extends between roller 232 and roller shaft 238 and is formed in part by a first thrust surface 246 and a second thrust surface 248. It can be noted that in track roller 230 first thrust surface 246 could be understood to face a first axial direction that is an axially inward direction, whereas second thrust surface 248 could be understood to face a second axial direction that is an axially outward direction. As used herein, the term "axially inward" can be understood to mean an axial direction toward an axial center point of a line segment formed by an axis within a physical object, whereas "axially outward" is an opposite direction. First thrust surface 246 is fixed relative to roller 238 by way of clamped collar 268, and second thrust surface 248 is formed on and thus fixed relative to roller shaft 238. A thrust washer stack 250 is trapped between first thrust surface 246 and second thrust surface 248, and fluidly sealed within seal cavity 244 by way of a dynamic seal 256. Collar 268 also includes a seal carrier 245, and a track roller 230 includes a second collar 276 that includes another seal carrier 277. Components of dynamic seal 256, which can include a metal face seal assembly, are held in compression between first seal carrier 245 and second seal carrier 277. It should also be appreciated that although only part of track roller 230 is illustrated in FIG. 4, an opposite part or end of track roller 230 would have a mirror-image configuration. Track roller 230 might be used in certain track-type track machines, whereas track roller 30 and track roller 130 might be used in certain mining machines, although the present disclosure is not thereby limited.

Figure 5:
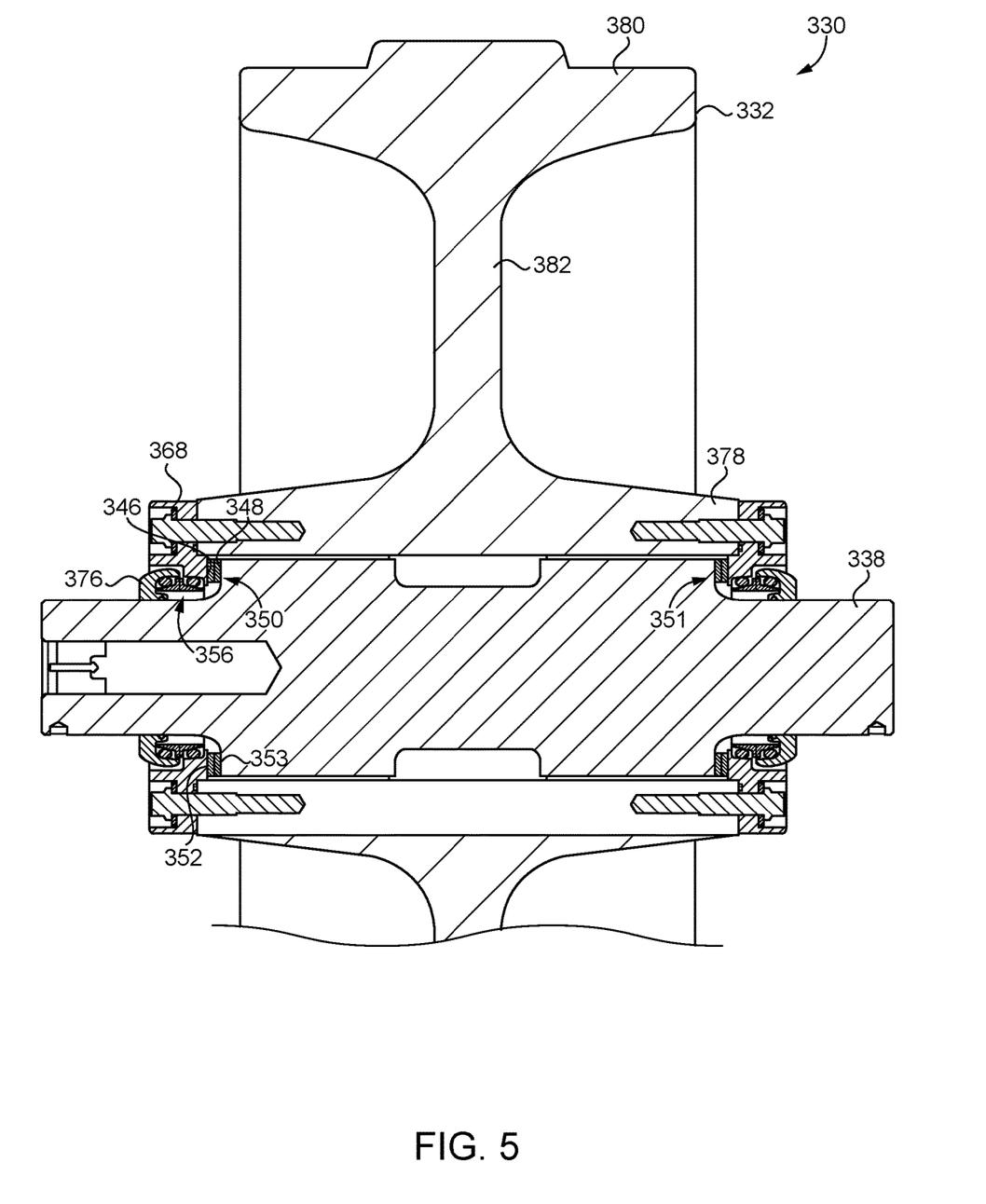
FIG. 5 is a sectioned side diagrammatic view of a rotatable track engaging element, according to yet another embodiment.

Referring now to FIG. 5, there is shown a rotatable track engaging element or idler 330 according to another embodiment. Idler 330 can include a roller 332 positioned upon and rotatable about a roller shaft 338. Roller 332 also includes an idler hub 378, and an idler rim 380, and a web 382 connecting between idler hub 378 and idler rim 380. Idler 330 also includes a first thrust washer stack 350 trapped between roller shaft 338 and a first collar 368 bolted to roller 332. A first thrust surface 346 is formed on collar 368, and a second thrust surface 348 is formed on roller shaft 338. A dynamic seal 356 supported in part by collar 368 and a second collar 376, fluidly seals thrust washer stack 350 within idler 330. Another thrust washer stack 351 may be analogously configured. Thrust washer stack 350 includes a first thrush thrust washer 352 in contact with first thrust surface 346, and a second thrust washer 353 in contact with second thrust surface 348. In idler 330, first thrust surface 346 faces a first axial direction that is an axially inward direction, and second thrust surface 348 faces a second axial direction that is an axially outward direction.

INDUSTRIAL APPLICABILITY

Referring to the drawings generally, but returning to the embodiment of FIG. 2 for descriptive purposes, when undercarriage assembly 28 is operated roller 32 can rotate around roller shaft 38 and support a weight of machine 10, in combination with other track rollers in track system 16, as track 24 is moved about the plurality of rotatable track engaging elements. Turning machine 10, tramming across a slope, or tramming over uneven ground, can cause side or thrust loads to be transmitted between track 24 and roller 32. Roller 32 can be urged axially relative to roller shaft 38, transmitting thrust loads to thrust washer stacks 50 or 51. Thrust washer stacks 50 or 51, depending on the direction of the thrust load, can transmit the loads to shaft supports 66 or 67, and to track roller frame 18.

During transmitting of thrust loads, roller 32 may be rotating about major axis 36. Contact between thrust surfaces 46 or 47 and first or inner thrust washers 52 or 55 can cause thrust washers 52 or 55 to rotate along with roller 32. Contact between second or outer thrust washers 54 or 53 and shaft supports 66 or 67 can impart a tendency for thrust washers 54 or 53 to remain stationary, with thrust washers 52 or 55 thus rotating, respectively, relative to thrust washers 54 or 53. It has been observed in earlier track systems employing only a single thrust washer that a speed differential between a rotating roller and a stationary shaft support, or intervening components, could result in wear rates greater than desired, transferring material, wearing away material, deforming the thrust washers, and potentially causing problems such as seal failure or track performance degradation.

In a theoretical example, with a rotating component, a stationary component, and a single thrust washer between the rotating component and the stationary component, the thrust washer could be expected to rotate at a speed approximately 50% of the speed difference between the rotating component and the stationary component. For example, if a roller in a track roller were rotated at 100 RPM, with the stationary shaft support at 0 RPM, an intervening single thrust washer could be expected to rotate at a fractional speed of rotation of the roller of approximately 50 RPM given a tendency for that intervening thrust washer to fictionally interact with each of the components that it contacts. In other words, the thrust washer is induced to rotate by the roller and rotation is resisted by the shaft support, so the thrust rotates at about half the relative speed of rotation between the roller and the shaft support. Wear rate, generally, is observed to be a function of pressure times velocity. Accordingly, with very heavy machines and large thrust loads, i.e. high pressure, coupled with relatively high velocities can produce wear rates greater than optimal, and ultimately lead to performance degradation or failure.

According to the present disclosure, with multiple intervening thrust washers a maximum relative speed differential can be less than in known single thrust washer designs. For example, a roller in a track roller according to the present disclosure might rotate at 100 RPM with an associated shaft support at 0 RPM. An inner thrust washer adjacent to the rotating roller might be expected to rotate at a fractional speed of rotation of the roller of about 66 RPM, with the thrust washer adjacent to the shaft support rotated at a second fractional speed of rotation of the roller that is less than the first fractional speed of rotation and equal to about 33 RPM, given the tendencies for the respective thrust washers to frictionally interact with the components that they contact. In this example according to the present disclosure, the maximum relative speed differential among any of the rotating roller, stationary support, or intervening two washers could be expected to be at least theoretically about 33 RPM. Recalling that wear rate is based on pressure times velocity, an observed wear rate in a theoretical example according to the present disclosure can be expected to be significantly less based on a difference of a max 33 RPM relative speed differential versus a max 50 RPM relative speed differential in a single thrust washer design. In a real world application the actual speeds and relative speeds might differ, however, the foregoing theoretical application is expected to be generally applicable, and across multiple embodiments.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while the foregoing discussion focuses on applications where one component rotates and the other is fixed, this relationship might be reversed. Further, each of two components, e.g. a roller and roller shaft, might be rotatable relative to the other in certain applications. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An undercarriage assembly comprising:
    a roller having a bore formed therein defining a major axis;
    a roller shaft extending through the bore to support the roller for rotation about the major axis;
    a seal cavity extending between the roller and the roller shaft and formed in part by a first thrust surface that faces a first axial direction and is fixed relative to the roller, and a second thrust surface that faces a second axial direction opposite to the first axial direction and is fixed relative to the roller shaft;
    a thrust washer stack trapped between the first thrust surface and the second thrust surface, to react thrust loads between the roller and the roller shaft, and including a first thrust washer in contact with the first thrust surface and rotatable at a first fractional speed of a speed of rotation of the roller, and a second thrust washer in contact with the second thrust surface and rotatable at a second fractional speed of rotation of the roller different from the first fractional speed of rotation; and
    a dynamic seal fluidly sealing the thrust washer stack within the seal cavity.

2. The undercarriage assembly of claim 1 wherein the second thrust washer is in contact with the first thrust washer and each of the first thrust washer and the second thrust washer is free to rotate about the major axis.

3. The undercarriage assembly of claim 2 wherein the dynamic seal includes a face seal assembly including a sealing ring and a seal biaser.

4. The undercarriage assembly of claim 3 further comprising a collar, and one of the first thrust surface or the second thrust surface is formed on the collar.

5. The undercarriage assembly of claim 4 wherein:
    the first thrust surface is formed on the collar, and the collar is bolted to the roller and includes a seal carrier rotatable with the roller about the major axis; and
    the second thrust surface is formed on the roller shaft.

6. The undercarriage assembly of claim 5 wherein:
    the roller includes an idler hub and an idler rim; and
    the first axial direction is an axially inward direction and the second axial direction is an axially outward direction.

7. The undercarriage assembly of claim 4 wherein:
    the second thrust surface is formed on the collar, and the collar is fixed to the roller shaft and includes a seal carrier; and
    the first thrust surface is formed on the roller.

8. The undercarriage assembly of claim 7 further comprising an idler and a drive sprocket, and the roller includes a roller shell in a track roller; and
    the first axial direction is an axially outward direction and the second axial direction is an axially inward direction.

9. A rotatable track engaging element for a machine track comprising:
    a roller shaft having a first shaft end and a second shaft end;
    a roller defining a major axis and being positioned upon the roller shaft;

a first shaft support structured to mount to a frame and receiving the first shaft end;

a second shaft support structured to mount to the frame and receiving the second shaft end;

a first thrust washer stack positioned upon the roller shaft and including a first plurality of thrust washers trapped between the first shaft support and the roller, wherein each thrust washer of the first plurality of thrust washers is rotatable at different fractional speeds of a speed of rotation of the roller; and a second thrust washer stack positioned upon the roller shaft and including a second plurality of thrust washers trapped between the second shaft support and the roller, wherein each thrust washer of the second plurality of thrust washers is rotatable at different fractional speeds of the speed of rotation of the roller.

10. The rotatable track engaging element of claim 9 wherein:

the first shaft support includes a first collar and the second shaft support includes a second collar; and the first thrust washer stack is in contact with at least one of the roller or the roller shaft, and the second thrust washer stack is in contact with at least one of the roller or the roller shaft.

11. The rotatable track engaging element of claim 10 wherein:

the first thrust washer stack is positioned to contact each of the roller and the first collar to directly react thrust loads between the roller and the first collar;

the second thrust washer stack is positioned to contact each of the roller and the second collar to directly react thrust loads between the roller and the second collar; and each of the first shaft support and the second shaft support further includes a pin fixing the roller shaft to the corresponding first collar or second collar.

12. The rotatable track engaging element of claim 11 further comprising:

a first dynamic seal positioned between the roller and the first collar and fluidly sealing the first thrust washer stack within the rotatable track engaging element; and a second dynamic seal positioned between the roller and the second shaft support and fluidly sealing the second thrust washer stack within the rotatable track engaging element.

13. The rotatable track engaging element of claim 10 including a total of two thrust washers in each of the first thrust washer stack and the second thrust washer stack, and the plurality of thrust washers of each of the first thrust washer stack and the second thrust washer stack are substantially identical to one another.

14. The rotatable track engaging element of claim 13 including a track roller where the roller includes a roller shell.

15. A sealed and lubricated rotatable track engaging element comprising:

a roller having a bore formed therein defining a major axis;

a roller shaft extending through the bore to support the roller for rotation about the major axis;

a first thrust surface fixed relative to the roller and facing a first axial direction;

a second thrust surface fixed relative to the roller shaft and facing a second axial direction;

a seal cavity extending between the roller and the roller shaft and formed in part by each of the first thrust surface and the second thrust surface;

a thrust washer stack within the seal cavity and trapped between the first thrust surface and the second thrust surface; and the thrust washer stack including a first thrust washer in contact with the first thrust surface and rotatable at a first fractional speed of a speed of rotation of the roller, and a second thrust washer in contact with the second thrust surface and rotatable at a second fractional speed of a speed of rotation of the roller different from the first fractional speed of rotation.

16. The rotatable track engaging element of claim 15 wherein the roller includes the first thrust surface, and further comprising a collar that includes the second thrust surface, and a pin fixing the collar to the roller shaft.

17. The rotatable track engaging element of claim 16 wherein the roller includes a first seal carrier and the collar includes a second seal carrier, and further comprising a dynamic seal fluidly sealing the seal cavity.

18. The rotatable track engaging element of claim 17 wherein the thrust washer stack includes a total of two thrust washers.

19. The rotatable track engaging element of claim 18 wherein:

the first thrust washer including an inner thrust washer, and the second thrust washer including an outer thrust washer, and each of the inner thrust washer and the outer thrust washer is free to rotate about the major axis; and the inner thrust washer contacts the roller to rotate at a first fractional speed of a speed of rotation of the roller; and the outer thrust washer contacts each of the inner thrust washer and the collar to rotate at a second fractional speed of the speed of rotation of the roller that is less than the first fractional speed.

20. The rotatable track engaging element of claim 19 wherein the roller includes a roller shell in a track roller.

* * * * *